(12) United States Patent
Koo (10) Patent No.: US 11,092,971 B2
(45) Date of Patent: Aug. 17, 2021

(54) SHARED MOBILITY SYSTEM USING ROBOTS AND CONTROL METHOD THEREOF

(71) Applicants: Hyundai Motor Company, Seoul (KR); Kia Motors Corporation, Seoul (KR)

(72) Inventor: Dong Han Koo, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 258 days.

(21) Appl. No.: 16/171,474

(22) Filed: Oct. 26, 2018

(65) Prior Publication Data

US 2019/0129445 A1  May 2, 2019

(30) Foreign Application Priority Data

Oct. 30, 2017  (KR) .................. 10-2017-0142819

(51) Int. Cl.
*G05D 1/02* (2020.01)
*B25J 9/00* (2006.01)
*B25J 9/16* (2006.01)

(52) U.S. Cl.
CPC .......... *G05D 1/0287* (2013.01); *B25J 9/0084* (2013.01); *B25J 9/163* (2013.01); *B25J 9/1664* (2013.01); *G05D 2201/0203* (2013.01); *G05D 2201/0207* (2013.01); *G05D 2201/0209* (2013.01); *G05D 2201/0212* (2013.01)

(58) Field of Classification Search
CPC ............................ G05D 1/0287; B25J 9/0084
See application file for complete search history.

(56) References Cited

U.S. PATENT DOCUMENTS

| | | | |
|---|---|---|---|
| 2002/0019760 A1* | 2/2002 | Murakami | G06Q 10/047 705/7.25 |
| 2008/0039974 A1* | 2/2008 | Sandin | B60L 50/52 700/258 |
| 2011/0153338 A1* | 6/2011 | Anderson | G01S 5/0009 705/1.1 |
| 2013/0073327 A1* | 3/2013 | Edelberg | G06Q 10/047 705/7.13 |

(Continued)

FOREIGN PATENT DOCUMENTS

| | | |
|---|---|---|
| JP | 5606927 | 10/2014 |
| KR | 10-2015-0075639 A | 7/2015 |

(Continued)

*Primary Examiner* — Jess Whittington
(74) *Attorney, Agent, or Firm* — Mintz Levin Cohn Ferris Glovsky and Popeo, P.C.; Peter F. Corless (57) ABSTRACT

A shared mobility system using robots may include: a plurality of robots configured to be allocated performance zones and to perform assigned tasks in the performance zones, or assigned tasks without restriction of the performance zones. When one or more deviating robots performing the assigned tasks in the performance zones deviate from corresponding performance zones, one or more adjacent robots in adjacent performance zones adjacent to the corresponding performance zones move to the corresponding performance zones, a number of the one or more adjacent robots moving to the corresponding performance zones equaling a number of the one or more deviating robots.

10 Claims, 7 Drawing Sheets

(56) References Cited

U.S. PATENT DOCUMENTS

| | | | |
|---|---|---|---|
| 2014/0039825 A1* | 2/2014 | Antonini | G01N 35/0099 |
| | | | 702/121 |
| 2015/0149022 A1* | 5/2015 | Harvey | G05D 1/0297 |
| | | | 701/23 |
| 2017/0203446 A1* | 7/2017 | Dooley | H04N 5/23206 |
| 2018/0081360 A1* | 3/2018 | Bostick | G06Q 10/04 |
| 2018/0299883 A1* | 10/2018 | Terzian | G05D 1/0287 |
| 2018/0299895 A1* | 10/2018 | Knotts | G06K 7/10297 |
| 2018/0311822 A1* | 11/2018 | Kaminka | B25J 9/1679 |
| 2019/0026671 A1* | 1/2019 | Al Falasi | G08G 1/202 |
| 2019/0235493 A1* | 8/2019 | Doane | G05D 1/0088 |
| 2020/0252851 A1* | 8/2020 | Tukmanov | H04W 76/10 |
| 2020/0345191 A1* | 11/2020 | Furuta | A47L 9/2857 |

FOREIGN PATENT DOCUMENTS

| | | |
|---|---|---|
| KR | 10-2017-0034752 A | 3/2017 |
| KR | 10-1742489 B1 | 6/2017 |
| WO | 2009-097336 A2 | 8/2009 |

* cited by examiner

SHARED MOBILITY SYSTEM USING ROBOTS AND CONTROL METHOD THEREOF

CROSS REFERENCE TO RELATED APPLICATION

The present application claims the benefit of priority to Korean Patent Application No. 10-2017-0142819, filed on Oct. 30, 2017 in the Korean Intellectual Property Office, the entire contents of which are incorporated herein by this reference.

BACKGROUND

Technical Field

The present disclosure relates to a shared mobility system using robots and a control method thereof, and more particularly, to a shared mobility system capable of moving a user to a destination by moving robots performing various tasks in allocated performance zones and a control method thereof.

Description of the Related Art

As increasing numbers of people reside in cities, new short-range traffic means are required due to traffic and parking problems. One conventional solution involved service robots; however, such robots are provided only in indoor services, and have not been combined with a mobility solution.

Conventional micro-mobility devices are possessed by an individual, but may be inconvenient in terms of portability. For example, car sharing is only available on roads. Thus, there is a problem in that transportation options are limited on narrow roads or sidewalks, and parking remains a challenge.

Accordingly, a new short-range traffic means capable of addressing the aforementioned traffic and parking limitations in cities is needed.

The contents described as the related art have been provided only to assist in understanding the background of the present disclosure and should not be considered as corresponding to the related art known to those having ordinary skill in the art.

SUMMARY

An object of the present disclosure is to provide a shared mobility system capable of moving a user to a destination by moving robots performing various tasks in allocated performance zones to the destination when required by the user, and allowing the robots to perform original tasks in zones to which the robots move when the user dismounts the robots, and a control method thereof.

According to embodiments of the present disclosure, a shared mobility system using robots may include: a plurality of robots to which performance zones are allocated, the plurality of robots configured to perform assigned tasks in the performance zones or tasks without restriction of the performance zones. When one or more deviating robots performing the assigned tasks in the performance zones deviate from corresponding performance zones, one or more adjacent robots in adjacent performance zones adjacent to the corresponding performance zones move to the corresponding performance zones, a number of the one or more adjacent robots moving to the corresponding performance zones equaling a number of the one or more deviating robots.

When one or more adjacent deviating robots of the one or more adjacent robots deviate from the adjacent performance zones due to the one or more adjacent robots moving to the corresponding performance zones, one or more other adjacent robots in other adjacent performance zones adjacent to the adjacent performance zones may move to the adjacent performance zones, a number of the one or more other adjacent robots equaling a number of the one or more adjacent deviating robots.

The robots may be further configured to receive a riding request from a user while performing the assigned tasks, to receive a destination from the user, and to move to the destination.

The robots may include a plurality of first robots configured to perform public security tasks in the corresponding performance zones; and a plurality of second robots configured to perform advertisement tasks in the corresponding performance zones.

The robots may further include a plurality of third robots configured to perform cleaning tasks without the restriction of the performance zones.

When a first robot of the plurality of first robots receives the riding request and the destination from the user, the first robot may be configured to accept the riding request, to move the user to the destination when the corresponding is located in any of the performance zones, and to call a second robot of the plurality of second robots or a third robot of the plurality of third robots to move the user to the destination when the destination is not located in any of the performance zones.

When a second robot of the plurality of second robots receives the riding request and the destination from the user, the second robot may be configured to accept the riding request and to move the user to the destination regardless of whether or not the destination is located in any of the performance zones, and when a deviating second robot of the plurality of second robots deviates from a performance zone due to the second robot moving the user to the destination, another second robot of the plurality of second robots allocated an adjacent performance zone adjacent to the performance zone from which the deviating second robot deviates may be configured to move to the performance zone from which the deviating second robot deviates.

When a third robot of the plurality of third robots is called by a first robot of the plurality of first robots or a second robot of the plurality of second robots, the third robot may be configured to move to a corresponding performance zone and to perform a cleaning task in the corresponding performance zone.

Furthermore, according to embodiments of the present disclosure, a shared mobility system using robots may include: a plurality of robots to which performance zones are allocated, the plurality of robots configured to perform assigned tasks in the performance zones or tasks without restriction of performance zones; and a server configured to allocate the performance zones to the plurality of robots and, when one or more deviating robots performing the assigned tasks in the performance zones deviate from corresponding performance zones, to cause one or more adjacent robots in adjacent performance zones adjacent to the corresponding performance zones to move to the corresponding performance zones, a number of the one or more adjacent robots moving to the corresponding performance zones equaling a number of the one or more deviating robots.

When one or more adjacent deviating robots of the one or more adjacent robots deviate from the adjacent performance zones due to the one or more adjacent robots moving to the corresponding performance zones, the server may be further configured to cause one or more other adjacent robots in other adjacent performance zones adjacent to the adjacent performance zones to move to the adjacent performance zones, a number of the one or more other adjacent robots equaling a number of the one or more adjacent deviating robots.

The plurality of robots may be further configured to receive a riding request from a user while performing the assigned tasks, to receive a destination from the user, and to move to the destination.

The robots may include a plurality of first robots configured to perform public security tasks in the corresponding performance zones; a plurality of second robots configured to perform advertisement tasks in the corresponding performance zones; and a plurality of third robots configured to perform cleaning tasks without the restriction of the performance zones.

When a first robot of the plurality of first robots receives the riding request and the destination from the user, the first robot may be configured to accept the riding request, to move the user to the destination when the corresponding is located in any of the performance zones, and to call a second robot of the plurality of second robots or a third robot of the plurality of third robots to move the user to the destination when the destination is not located in any of the performance zones.

When a second robot of the plurality of second robots receives the riding request and the destination from the user, the second robot may be configured to accept the riding request and to move the user to the destination regardless of whether or not the destination is located in any of the performance zones, and when a deviating second robot of the plurality of second robots deviates from a performance zone due to the second robot moving the user to the destination, the server may be further configured to cause another second robot of the plurality of second robots allocated an adjacent performance zone adjacent to the performance zone from which the deviating second robot deviates to move to the performance zone from which the deviating second robot deviates.

When a third robot of the plurality of third robots is called by a first robot of the plurality of first robots or a second robot of the plurality of second robots, the server may be further configured to cause the third robot to move to a corresponding performance zone and to perform a cleaning task in the corresponding performance zone.

Furthermore, according to embodiments of the present disclosure, a shared mobility system using robots may include: a plurality of robots with a space in which a user rides disposed therein, the plurality of robots allocated performance zones by a server, and the plurality of robots including a position information receiving unit configured to receive global positioning system (GPS) information, a communication unit configured to communicate with the server and with other robots, and a controller configured to perform an assigned task in a corresponding performance zone or a task without restriction of the corresponding performance zone, to receive a destination from the user, and to move the user to the destination in response to receiving a riding request from the user while performing the assigned task; the server configured to allocate the performance zones to the plurality of robots, to monitor a position of and a state of the plurality of robots, and, when one or more deviating robots performing the assigned tasks in the performance zones deviate from corresponding performance zones, to cause one or more adjacent robots in adjacent performance zones adjacent to the corresponding performance zones to move to the corresponding performance zones, a number of the one or more adjacent robots moving to the corresponding performance zones equaling a number of the one or more deviating robots; and a plurality of charging stations provided in one or more performance zones, each of the charging stations including a wired/wireless charging system disposed at a lower portion thereof that is configured to supply power to the plurality of robots.

Each of the plurality of robots may further includes a battery management unit configured to monitor a state of charge of a battery of a robot and to transmit the state of charge to the communication unit, and when a state of charge of a battery of a particular robot among the plurality of robots is less than a preset reference value, the server is further configured to cause the particular robot to move to the charging station.

The server may be further configured to receive weather information, and to cause the plurality of robots to move to the charging stations when the weather information indicates rain or snow.

Furthermore, according to embodiments of the present disclosure, a method of controlling the shared mobility system using robots as described above may include: receiving, by a controller of a particular robot, a riding request and a destination from a user; causing, by a server in communication with the robots, the particular robot to move to the destination; and when one or more deviating robots performing the assigned tasks in the performance zones deviate from corresponding performance zones, causing, by the server, one or more adjacent robots in adjacent performance zones adjacent to the corresponding performance zones to move to the corresponding performance zones, a number of the one or more adjacent robots moving to the corresponding performance zones equaling a number of the one or more deviating robots.

The method may further include, when one or more adjacent deviating robots of the one or more adjacent robots deviate from the adjacent performance zones due to the one or more adjacent robots moving to the corresponding performance zones, causing, by the server, one or more other adjacent robots in other adjacent performance zones adjacent to the adjacent performance zones to move to the adjacent performance zones, a number of the one or more other adjacent robots equaling a number of the one or more adjacent deviating robots.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a shared mobility system using robots and a control method thereof according to various embodiments of the present disclosure will be described with reference to the accompanying drawings.

Figure 1:
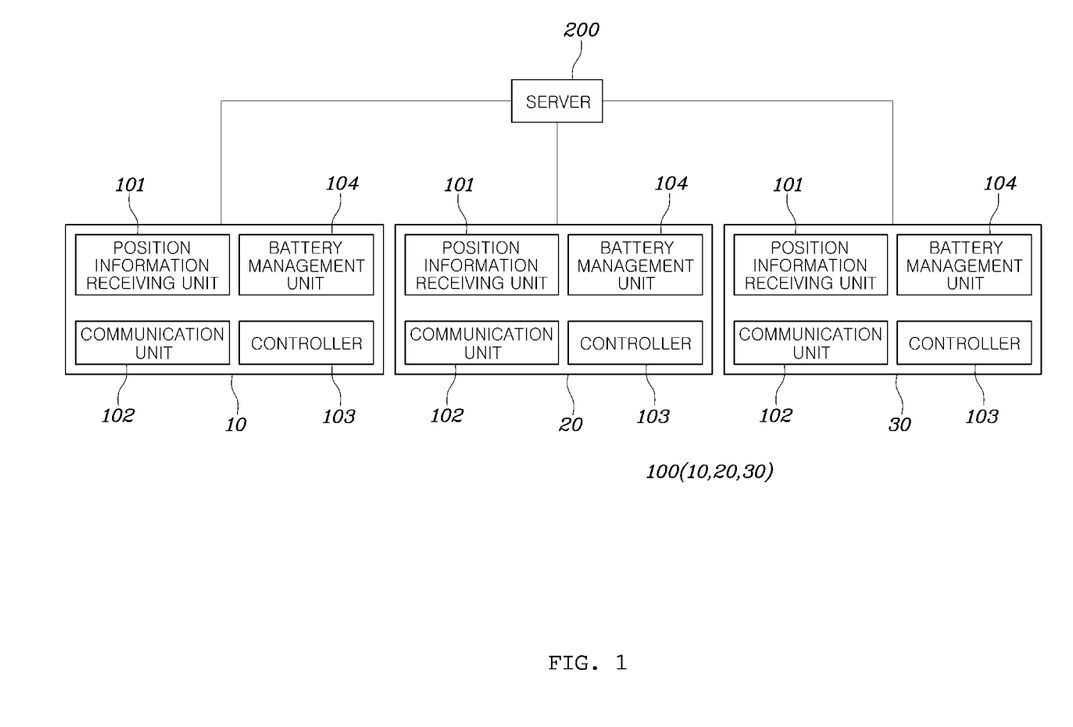
FIG. 1 is a block diagram of a shared mobility system using robots according to embodiments of the present disclosure.

First, FIG. 1 is a block diagram of a shared mobility system using robots according to embodiments of the present disclosure. As shown in FIG. 1, a shared mobility system using robots according to embodiments of the present disclosure may include a plurality of robots 100 allocated performance zones and performing assigned tasks in the allocated performance zones or performing tasks without restriction of performance zones.

Each of the plurality of robots 100 may include a position information receiving unit 101 receiving global positioning system (GPS) information, a communication unit 102 transmitting and receiving information to and from other robots and a server, and a controller 103 allocated a performance zone from the server and performing an assigned task in the allocated performance zone or performing a task without restriction of performance zone and receiving a destination from a user and moving the user to the destination in the case of receiving a riding request from the user during performing the task. Although not illustrated in the drawings, each of the robots 100 has a space in which a user rides. The space may have a footplate shape in which both feet of the use may be supported or a seating type shape in which the hip and both feet of the user may be supported, as an example.

The controller 103 of each of the robots 100 allocated performance zones from the server 200 and performing assigned tasks in the allocated performance zones or the robots 100 performing tasks without restriction of performance zones receives the destination from the user and moves the user to the destination in the case of receiving the riding request from the user during performing the task.

Figure 2:
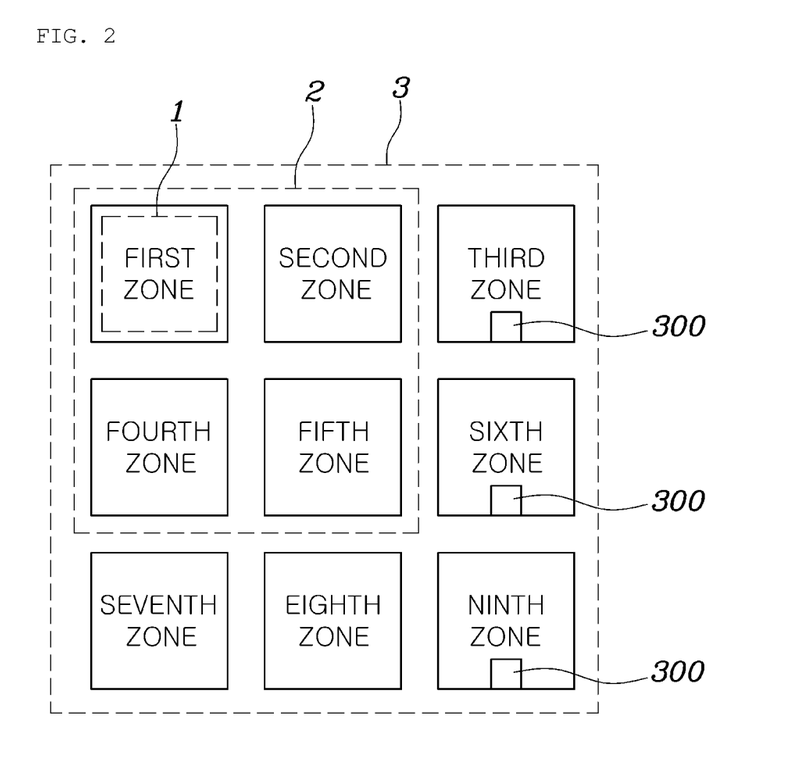
FIG. 2 is a diagram illustrating performance zones of robots according to embodiments of the present disclosure.

Here, the performance zones may be divided as illustrated in FIG. 2. FIG. 2 is a diagram illustrating performance zones of robots according to embodiments of the present disclosure. As shown in FIG. 2, a form of receiving the riding request from the user may be a form in which the user clicks the riding request on a display provided in each of the robots 100 or a form in which serves makes the riding request for a robot 100 adjacent to the user server when the user makes the riding request through a mobile terminal.

The plurality of robots 100 may include a plurality of first robots 10 performing public security tasks in the corresponding performance zones; a plurality of second robots performing advertisement tasks in the corresponding performance zones; and a plurality of third robots 30 performing cleaning tasks without the restriction of the performance zones as an example.

Here, the first robot 10, which is a public security robot performing the public security task, is allocated a unit zone 1 as a performance zone as illustrated in FIG. 2 and performs public security tasks in the performance zone, in order to increase an effect of maintenance of public security.

Further, when the first robot 10 receives the riding request and the destination from the user, the first robot 10 accepts the riding request and moves the user to the corresponding destination only when the corresponding destination is included in the allocated performance zone. The first robot 10 calls the second robot 20 or the third robot 30 to move the user to the corresponding destination when the corresponding destination is not included in the allocated performance zone.

Here, the second robot 20 or the third robot 30 accepts the riding request and moves the user to a corresponding destination to be described below regardless of whether or not the corresponding destination is included in the allocated performance zone. Therefore, the first robot 10 calls the second robot 20 or the third robot 30 to move the user to the corresponding destination when the corresponding destination is not included in the allocated performance zone.

Meanwhile, the call for the second robot 20 or the third robot 30 by the first robot 10 may be performed through communication between robots or through the server as an example.

The second robot 20 is an advertisement robot performing an advertisement task, and is allocated a performance zone 2 wider than that of the first robot 10 and performs the advertisement task in the corresponding performance zone because a guide escort service is necessary after the advertisement.

Further, when the second robot 20 receives the riding request and the destination from the user, the second robot 20 accepts the riding request and moves the user to the corresponding destination regardless of whether or not the corresponding destination is included in the allocated performance zone. The second robot 20 may serve to move the user to a destination as a shared mobility when the user inputs a riding request and a destination as well as move the user to an advertisement business when the user requests an escort service of the advertisement business (for example, when the user touches the second robot 20, searches a famous restaurant through a display of the second robot 20, and then designates a destination, the user moves to the famous restaurant in the second robot 20).

Figure 3:
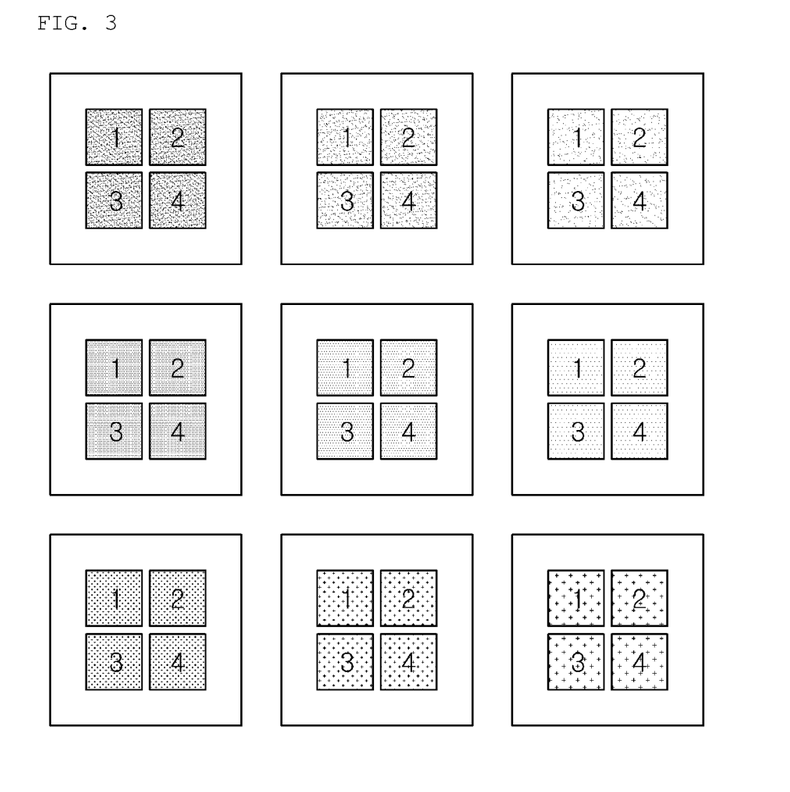
FIGS. 3 to 5 are diagrams illustrating a shared mobility system using robots according to embodiments of the present disclosure.
Figure 4:
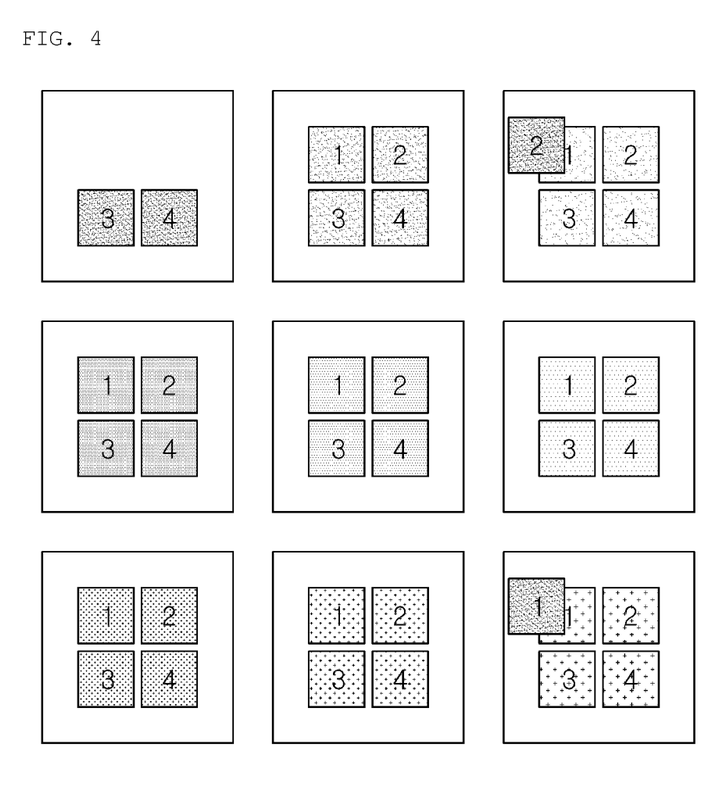
Figure 5:
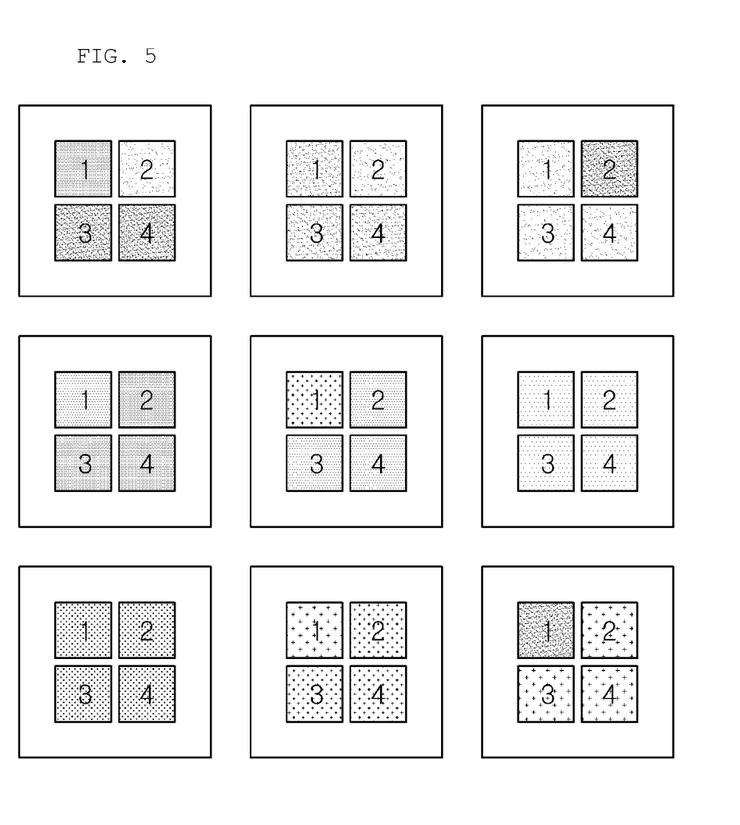

FIGS. 3 to 5 are diagrams illustrating a shared mobility system using robots according to embodiments of the present disclosure. As shown in FIGS. 3 to 5, when one or more of the plurality of robots 100 performing the assigned tasks in the performance zones deviate from the corresponding performance zones, robots 100 in performance zones adjacent to the corresponding performance zones may move to the corresponding performance zones by the number of robots 100 deviating from the corresponding performance zones.

Here, according to embodiments of the present disclosure, a mechanism in which the second robot 20 deviates from the performance zone and another second robot 20 moves to the performance zone from which the second robots 20 is deviated will be described.

As illustrated in FIG. 3, the plurality of second robots 20 are allocated performance zones and are disposed in the allocated performance zones. As illustrated in FIG. 4, two second robots 20 move from a first zone to a third zone and a ninth zone that are performance zones due to a riding request or an escort by the user. In this case, as illustrated in FIG. 5, second robots 20 in second and fourth zones adjacent to the first zone, which is the corresponding performance zone, move to the first zone by the number of deviating second robots 20, resulting in balancing. Deviation occurs due to the movement of the second robots 20 in the second and fourth zones, such that second robots 20 in a fifth or seventh zone, which is a performance zone adjacent to the second and fourth zones from which the deviation occurs, may move by the number of deviating second robots 20. However, since the fifth zone is a zone in a route (the first zone→ the fifth zone→ the ninth zone) through which the second robot 20 (No. 1) passes, the number of second robots 20 becomes instantaneously five to cause an excessive advertisement, such that the second robot 20 in the fifth zone moves.

Likewise, as illustrated in FIG. 5, in the second zone from which the deviation occurs, a second robot 20 in the third zone in a route (the first zone→ the second zone→ the third zone) in which a second robot 20 (No. 2) passes moves to the second zone. Finally, as illustrated in FIG. 5, when the deviation occurs due to the movement, the second robots 20 in performance zones adjacent to the performance zones from which the deviation occurs move to the performance zones from which the deviation occurs by the number of deviating second robots 20 to maintain entire balancing, thereby making it possible to prevent the excessive advertisement to satisfy an advertiser's need.

Meanwhile, the reason why the second robots 20 in the first zone, the third zone, and the ninth zone are not exchanged with each other is that a balance may be made in the shortest time period by moving the robots in the most adjacent zones.

The third robot 30, which is a cleaning robot performing a cleaning task, performs the cleaning task without restriction of a performance zone in order to maintain a clean state regardless of the number of users.

Figure 6:
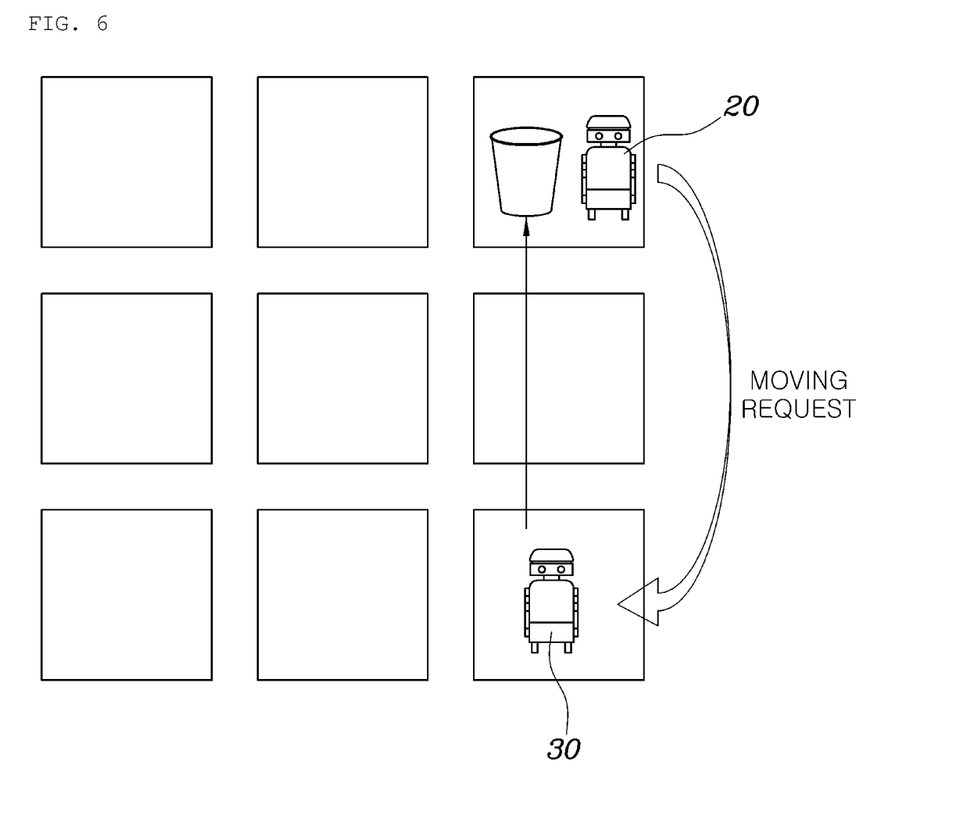
FIG. 6 is a diagram illustrating a third robot according to embodiments of the present disclosure.

FIG. 6 is a diagram illustrating a third robot according to embodiments of the present disclosure. As shown in FIG. 6, the third robot 30 moves to a corresponding zone and performs the cleaning task, when it is called by the first robot 10 or the second robot 20.

Here, the first robot 10 or the second robot 20 may detect trash and call the third robot 30. Alternatively, when the first robot 10 or the second robot 20 detects trash through an embedded camera and requests the server 200 to call the third robot 30, the server 200 may move the third robot 30 to the corresponding position.

According to embodiments of the present disclosure, when the user requests the server 200 to collect the trash through a mobile terminal, the server 200 may move the third robot 30 to the position requested by the user to allow the third robot 30 to perform the cleaning task. Additionally, or alternatively, when a waste basket disposed in each of several zones and provided with a communication unit that may communicate with the robots 100 or the server 200 detects a specific amount of trash, the waste basket requests the server 200 to collect the trash, and the server 200 moves the third robot 30 to a position of the waste basket requesting the server 200 to collect the trash to perform the collection task.

When the first robot 10 receives the riding request and the destination from the user as described above, when the first robot 10 calls the third robot 30 since the corresponding destination is not included in the allocated performance zone, the third robot 30 may move to the corresponding position to move the user to the corresponding destination.

A shared mobility system using robots according to embodiments of the present disclosure may include: a plurality of robots 100 allocated performance zones and performing assigned tasks in the allocated performance zones or performing tasks without restriction of performance zones; and a server 200 allocating task performance zones to the plurality of robots 100, and moving robots 100 in performance zones adjacent to the corresponding performance zones to the corresponding performance zones by the number of robots 100 deviating from the corresponding performance zones when one or more of the plurality of robots 100 performing the assigned tasks in the performance zones deviate from the corresponding performance zones.

Here, the server 200 may allocate task performance zones to the plurality of robots 100, monitor positions and states of the plurality of robots 100, and move robots 100 in performance zones adjacent to the corresponding performance zones to the corresponding performance zones by the number of robots 100 deviating from the corresponding performance zones when one or more of the plurality of robots 100 performing the assigned tasks in the performance zones deviate from the corresponding performance zones.

Here, the position of the robot 100 is a position derived through the position information receiving unit 101 of the robot 100, and the state of the robot 100 may be a state of charge (SOC) derived by a battery management unit 104 to be described below or a state depending on a task of each robot 100 (e.g., an emergency state depending on recognition of a dangerous situation when the robot is the public security robot or a fault state of each robot). A mechanism of moving the plurality of robots 100 and the robots 100 in the performance zones adjacent to the corresponding performance zones to the corresponding performance zone by the number of deviating robots 100 is the same as that of the above-described mobility system, and a description thereof will be omitted.

A shared mobility system using robots according to embodiments of the present disclosure may include: a plurality of robots 100 each having a space in which a user rides and including a position information receiving unit 101 receiving global positioning system (GPS) information, a communication unit 102 transmitting and receiving information to and from other robots 100 and a server 200, and a controller 103 allocated a performance zone from the server and performing an assigned task in the allocated performance zone or performing a task without restriction of performance zone and receiving a destination from the user and moving the user to the destination in the case of receiving a riding request from the user during performing the task; the server 200 allocating task performance zones to the plurality of robots, monitoring positions and states of the plurality of robots, and moving robots 100 in performance zones adjacent to the corresponding performance zones to the corresponding performance zones by the number of robots 100 deviating from the corresponding performance zones when one or more of the plurality of robots 100 performing the assigned tasks in the performance zones deviate from the corresponding performance zones; and charging stations 300 each including a wired/wireless charging system disposed at a lower portion thereof to charge power in the plurality of robots, and provided in one or more performance zones.

Here, each of the charging stations 300 includes the wired/wireless charging system on the lower portion thereof, and when the robot 100 is disposed at a specific position, a plug type wired charger is inserted into the robot 100 such that the robot 100 may be charged with power, or the robot 100 may be charged with power in a wireless charging manner without insertion thereof.

Since a space of the charging station 300 is limited, when the plurality of robots 100 enter the charging station 300, they may be operated in a charging sequence of first in/first out (FIFO). Since the robot 100 first entering the charging station is charged with a larger amount of power, it is preferable that the charging sequence is the FIFO, but is not limited thereto. For example, the robots 100 may exit at any time regardless of a sequence in which they enter the charging station 300.

Each of the plurality of robots 100 may include a battery management unit 104 monitoring a state of charge of a battery and transmitting the state of charge to the communication unit 102, and when there is a robot 100 of which a state of charge is less than a preset reference value among the plurality of robots 100, the server 200 moves the corresponding robot to the charging station 300.

Here, a reference value of the state of charge (SOC) may be changed depending on setting and may be 50% by way of example, but is not limited thereto.

The server 200 receives weather information, and moves the plurality of robots 100 to the charging stations 300 when it rains or snows.

Here, the charging station 300 may serve as a depository when it rains or the charging station 300 is not operated. The server 200 may receive the weather information through the internet.

Figure 7:
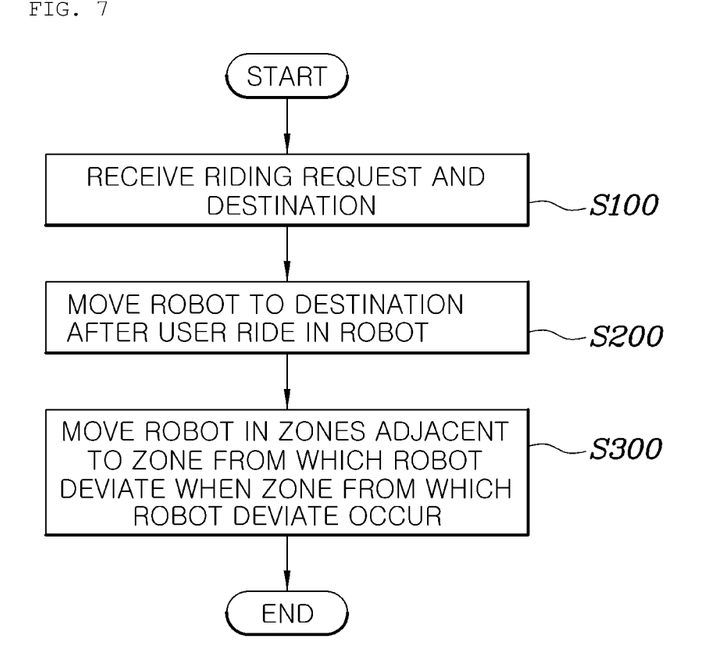
FIG. 7 is a flowchart of a control method of the shared mobility system using robots according to embodiments of the present disclosure.

A control method of a shared mobility system using robots according to embodiments of the present disclosure may include: receiving a riding request and a destination from a user (S100); moving a robot receiving the riding request to the received designation (S200); and moving the robots in the performance zones adjacent to the corresponding performance zones to the corresponding performance zones by the number of robots deviating from the corresponding performance zones (S300) when one or more of the plurality of robots allocated the performance zones and performing the assigned tasks in the allocated performance zones deviate from the corresponding performance zones.

In the receiving of the riding request and the destination from the user (S100), the riding request or the destination may be received from the user through a display provided in each robot or be received from the user through a mobile terminal of the user. When the riding request or the destination is received from the user through the mobile terminal of the user, the server requests a robot adjacent to the user to allow the user to ride in the robot.

In the moving of the robot receiving the riding request to the received designation (S200), the robot receiving the riding request moves the user to the received destination.

In the moving of the robots in the performance zones adjacent to the corresponding performance zones to the corresponding performance zones (S300), when one or more of the plurality of robots allocated the performance zones and performing the assigned tasks in the allocated performance zones deviate from the corresponding performance zones, the robots in the performance zones adjacent to the corresponding performance zones move to the corresponding performance zones by the number of robots deviating from the corresponding performance zones, and when deviation of the robots from the adjacent performance zones occurs due to the movement of the robots in the adjacent performance zones to the corresponding performance zones, robots in performance zones adjacent to the performance zones from which the deviation occurs move to the performance zones from which the deviation occurs by the number of robots in the performance zones from which the deviation occurs.

A mechanism of moving the robots in the performance zones adjacent to the performance zones from which the deviation occurs to the performance zones from which the deviation occurs by the number of robots in the performance zones from which the deviation occurs is the same as that of the above-described mobility system, a detailed description thereof will be omitted.

As described above, according to the shared mobility system using robots and the control method thereof according to the embodiments of the present disclosure, it is possible to move the user to the destination using the robots whenever required by the user by moving the robots performing various tasks in the allocated performance zones to the destination when required by the user and allowing the robots to perform original tasks in the zones to which the robots move when the user gets off the robot.

Further, it is possible to perform an escort to a destination while providing information to the user through the display attached to the robot.

Further, it is possible to enhance public security by operating the robots which perform security-related tasks at night as well as during the day.

Further, it is possible to provide advertisements in the allocated zones through the robots which perform advertisement-related tasks.

Further, it is possible to promote a clean environment by using the robots to collect trash on the ground.

Further, when deviation occurs due to movement of robots, as described above, the second robots in the performance zones adjacent to the performance zones from which the deviation occurs move to the performance zones from which the deviation occurs by the number of deviating second robots to maintain balance, thereby preventing excessive advertisement.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A shared mobility system using robots, comprising:
a plurality of robots configured to be allocated in performance zones and to perform assigned tasks in the performance zones, or to perform assigned tasks without restriction of the performance zones,
wherein, when one or more of the robots performing the assigned tasks in one of the performance zones depart from the one of the performance zones, one or more of the robots in another performance zone adjacent to the one of the performance zones move to the one of the performance zones,
wherein a quantity of the one or more robots moving to the one of the performance zones is equal to a quantity of the one or more robots departing from the one of the performance zones,
wherein the plurality of robots are further configured to receive a riding request from a user while performing the assigned tasks, to receive a destination in the performance zones or without restriction of the performance zones from the user, and to move to the destination,
wherein the plurality of robots include:
a plurality of first robots configured to perform public security tasks in the performance zones;
a plurality of second robots configured to perform advertisement tasks in the performance zones; and
a plurality of third robots configured to perform cleaning tasks without restriction of the performance zones, and
wherein, when one of the plurality of first robots receives the riding request and the destination from the user, the one of the plurality of first robots is configured to accept the riding request, to move the user to the destination when the destination is located in any of the performance zones, and to call one of the plurality of second robots or one of the plurality of third robots to move the user to the destination when the destination is not located in any of the performance zones.

2. The shared mobility system using robots of claim 1, wherein, when one of the plurality of second robots receives the riding request and the destination from the user, the one of the plurality of second robots is configured to accept the riding request and to move the user to the destination regardless of whether or not the destination is located in any of the performance zones, and
when the one of the plurality of second robots breaks away from a performance zone due to the one of the plurality of second robots moving the user to the destination, another of the plurality of second robots to which a performance zone adjacent to the performance zone from which the one of the plurality of second robots is allocated is configured to move to the performance zone from which the one of the plurality of second robots breaks away.

3. The shared mobility system using robots of claim 1, wherein, when one of the plurality of third robots is called by the one of the plurality of first robots or one of the plurality of second robots, the one of the plurality of third robots is configured to move to a corresponding performance zone and to perform cleaning tasks in the corresponding performance zone.

4. A shared mobility system using robots comprising:
a plurality of robots to which performance zones are allocated, the plurality of robots configured to perform assigned tasks in the performance zones or tasks without restriction of performance zones; and
a server configured to allocate the performance zones to the plurality of robots and, when one or more of the robots performing the assigned tasks in one of the performance zones depart from the one of the performance zones, to cause one or more robots in another performance zone adjacent to the one of the performance zones to move to the one of the performance zones,
wherein a quantity of the one or more robots moving to the one or more performance zones is equal to a quantity of the one or more robots departing from the one of the performance zones,
wherein the plurality of robots are further configured to receive a riding request from a user while performing the assigned tasks, to receive a destination in the performance zones or without restriction of the performance zones from the user, and to move to the destination,
wherein the plurality of robots include:
a plurality of first robots configured to perform public security tasks in the performance zones;
a plurality of second robots configured to perform advertisement tasks in the performance zones; and
a plurality of third robots configured to perform cleaning tasks without restriction of the performance zones, and
wherein, when one of the plurality of first robots receives the riding request and the destination from the user, the one of the plurality of first robots is configured to accept the riding request, to move the user to the destination when the destination is located in any of the performance zones, and to call one of the plurality of second robots or one of the plurality of third robots to move the user to the destination when the destination is not located in any of the performance zones.

5. The shared mobility system using robots of claim 4, wherein, when one of the plurality of second robots receives the riding request and the destination from the user, the one of the plurality of second robots is configured to accept the riding request and to move the user to the destination regardless of whether or not the destination is located in any of the performance zones, and when the one of the plurality of second robots breaks away from a performance zone due to the one of the plurality of second robots moving the user to the destination, the server is further configured to cause another of the plurality of second robots allocated an adjacent performance zone adjacent to the performance zone from which the one of the plurality of second robots breaks away to move to the performance zone from which the one of the plurality of second robots breaks away.

6. The shared mobility system using robots of claim 4, wherein, when one of the plurality of third robots is called by one of the plurality of first robots or one of the plurality of second robots, the server is further configured to cause the one of the plurality of third robots to move to a corresponding performance zone and to perform cleaning tasks in the corresponding performance zone.

7. A shared mobility system using robots, comprising:
a plurality of robots with a space in which a user rides disposed therein, and the plurality of robots including a position information receiving unit configured to receive global positioning system (GPS) information, a communication unit configured to communicate with a server and other robots, and a controller configured to be allocated performance zones by the server and perform assigned tasks in allocated corresponding performance zone or to perform assigned tasks without restriction of performance zone, to receive a destination from the user, and to move the user to the destination in response to receiving a riding request from the user while performing the assigned tasks;
the server configured to allocate the performance zones to the plurality of robots, to monitor a position of and a state of the plurality of robots, and, when one or more of the robots performing the assigned tasks in the one of performance zones depart from the one of the performance zones, to cause one or more of the robots in another performance zone adjacent to the one of the performance zones to move to the one of the performance zones, wherein a quantity of the one or more robots moving to the one of the performance zones is equal to a quantity of the one or more robots departing from the one of the performance zones, and wherein the plurality of robots are further configured to receive a riding request from a user while performing the assigned tasks, to receive a destination in the performance zones or without restriction of the performance zones from the user, and to move to the destination; and
a plurality of charging stations provided in one or more performance zones, each of the charging stations including a wired/wireless charging system disposed at a lower portion thereof that is configured to supply power to the plurality of robots,
wherein the plurality of robots include:
a plurality of first robots configured to perform public security tasks in the performance zones;
a plurality of second robots configured to perform advertisement tasks in the performance zones; and
a plurality of third robots configured to perform cleaning tasks without restriction of the performance zones, and
wherein, when one of the plurality of first robots receives the riding request and the destination from the user, the one of the plurality of first robots is configured to accept the riding request, to move the user to the destination when the destination is located in any of the performance zones, and to call one of the plurality of second robots or one of the plurality of third robots to move the user to the destination when the destination is not located in any of the performance zones.

8. The shared mobility system using robots of claim 7, wherein each of the plurality of robots further includes a battery management unit configured to monitor a state of charge of each of the plurality of robots and to transmit the state of charge to the communication unit, and
when a state of charge of a battery of a particular robot among the plurality of robots is less than a preset reference value, the server is further configured to cause the particular robot to move to one of the charging stations.

9. The shared mobility system using robots of claim 7, wherein the server is further configured to receive weather information, and to cause each of the plurality of robots to move to one of the charging stations when the weather information indicates rain or snow.

10. A method of controlling a shared mobility system using robots to which performance zones are allocated, wherein the robots are configured to perform assigned tasks in the performance zones or tasks without restriction of the performance zones, the method comprising:
receiving, by a controller of a particular robot, a riding request and a destination from a user;
causing, by a server in communication with the robots, the particular robot to move to the destination; and
when one or more of the robots performing the assigned tasks in one of the performance zones depart from the one of the performance zones, causing, by the server, one or more of the robots in another performance zone adjacent to the one of the performance zones to move to the one of the performance zones,
wherein a quantity of the one or more robots moving to the one of the performance zones is equal to a quantity of the one or more robots departing from the one of the performance zones,
wherein the robots are further configured to receive a riding request from a user while performing the assigned tasks, to receive a destination in the performance zones or without restriction of the performance zones from the user, and to move to the destination,
wherein the plurality of robots include:
a plurality of first robots configured to perform public security tasks in the performance zones;
a plurality of second robots configured to perform advertisement tasks in the performance zones; and
a plurality of third robots configured to perform cleaning tasks without restriction of the performance zones, and
wherein, when one of the plurality of first robots receives the riding request and the destination from the user, the one of the plurality of first robots is configured to accept the riding request, to move the user to the destination when the destination is located in any of the performance zones, and to call one of the plurality of second robots or one of the plurality of third robots to move the user to the destination when the destination is not located in any of the performance zones.

\* \* \* \* \*